(No Model.)
D. O. EVEREST.
HARROW.
No. 426,666. Patented Apr. 29, 1890.
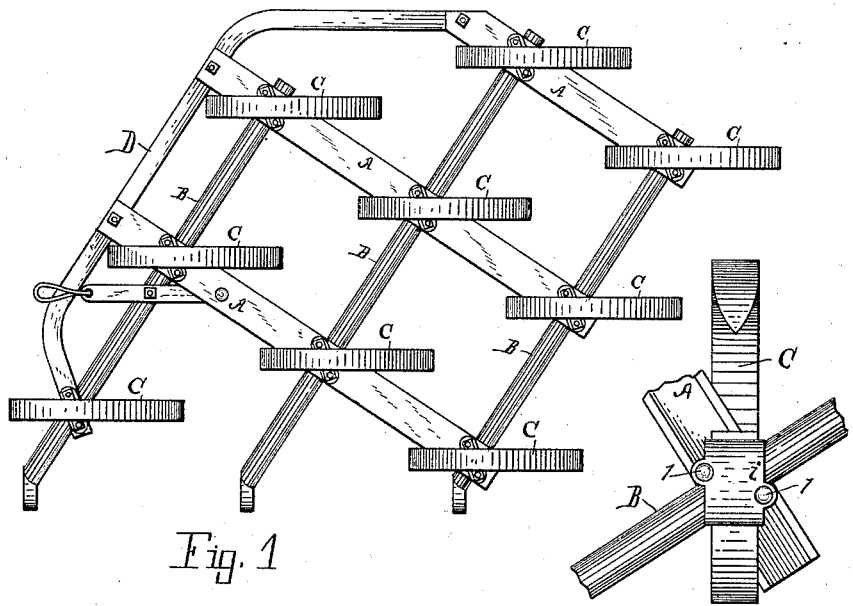
Fig. 1
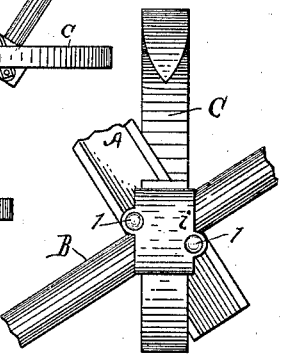
Fig. 3
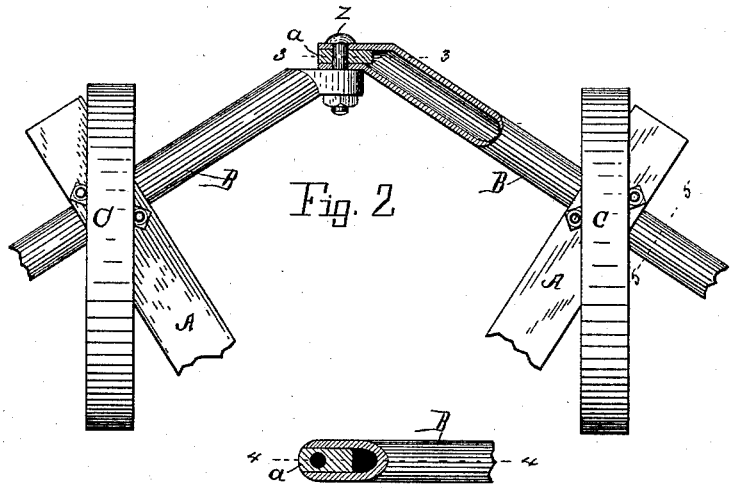
Fig. 2
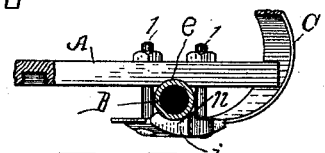
Fig. 4
Fig. 5
Witnesses:
Walter S. Hood
Belle C. Freeman
Inventor.
David O. Everest
By Lucius C. West
Atty

UNITED STATES PATENT OFFICE.

DAVID O. EVEREST, OF PINE GROVE, MICHIGAN.

HARROW.

SPECIFICATION forming part of Letters Patent No. 426,666, dated April 29, 1890.

Application filed October 18, 1889. Serial No. 327,407. (No model.)

*To all whom it may concern:*

Be it known that I, DAVID O. EVEREST, a citizen of the United States, residing at Pine Grove, county of Van Buren, State of Michigan, have invented a new and useful Harrow, of which the following is a specification.

This invention relates to that class of float harrows employing frames made of metal; and it has for its object the below described and claimed peculiarities in the construction of the frame and the clamping device for attaching the draft-bars and cross-bars together, and for holding the harrow-teeth.

In the drawings forming a part of this specification, Figure 1 is a plan view of one half of the harrow. Fig. 2 is an enlarged plan of lettered details from each half of the harrow, parts being in section on line 4 4 in Fig. 4. Fig. 3 is an inverted plan of a portion of the frame and one of the teeth at the place in the frame where said tooth is attached. Fig. 4 is a section on line 3 3 in Fig. 2, and Fig. 5 is a section on line 5 5 in Fig. 2.

Referring to the lettered parts of the drawings, B B are the draft-bars, made out of gas-pipe. A A are the cross-bars, and D is the brace-bar, Fig. 1, said figure showing one half of an ordinary butterfly harrow-frame so far as the shape is concerned.

The ends of the draft-bars B of one half of the frame are hinged to the corresponding draft-bars of the other half of the frame, as in Fig. 2.

I prepare the ends of the hollow draft-bars so as to adapt them for hinging together by inserting a piece of metal *a* into the end of said bars, and then hammering or pressing the ends so as to flatten them and weld the pipes and metal pieces together. These ends are turned at right angles to the line of draft and are perforated to receive the hinging-bolt *z*, as shown in Fig. 2.

The under side of the cross-bars A are provided with concavities *e*, Fig. 5, to fit the upper periphery of the draft-bars B.

At *i* is shown the clip-plate which binds the shank of the teeth C against the under side of the round hollow draft-bars B, and also binds the draft-bars and cross-bars together at their points of intersection by the bolts 1 1. The clip-plates are concaved obliquely across, as at *n* in Fig. 5, to fit the under periphery of the draft-dars. By this means the teeth, the round draft-bars, and the angular cross-bars are not only firmly bound together, but the teeth are easily adjusted as well, in regard to depth of cut, by loosening the rear bolt and tightening the front bolt, or vice versa, as the case may be, which action rocks the clip-plate on the round surface of the draft-bars.

Having thus described my invention, what I claim as new, and desire to secure by Letters Patent of the United States, is—

In a harrow-frame, the combination of the round draft-bar, the cross-bar angular in cross-section and provided with a concavity on the under side adapted to fit the upper periphery of the round draft-bar, the clip-plate having the concavity fitting the under periphery of the draft-bar, and a harrow-tooth the shank of which is clamped against the under periphery of the metal draft-bar by said clip, substantially as set forth.

In testimony of the foregoing I have hereunto subscribed my name in presence of two witnesses.

DAVID O. EVEREST.

Witnesses:
L. N. BURKE,
HARRY BARKER.